(12) United States Patent
Sasho

(10) Patent No.: US 8,948,710 B2
(45) Date of Patent: Feb. 3, 2015

(54) RECEIVING DEVICE AND SEMICONDUCTOR INTEGRATED CIRCUIT

(71) Applicant: Sony Corporation, Tokyo (JP)

(72) Inventor: Noboru Sasho, Kanagawa (JP)

(73) Assignee: Sony Corporation, Tokyo (JP)

( * ) Notice: Subject to any disclaimer, the term of this patent is extended or adjusted under 35 U.S.C. 154(b) by 108 days.

(21) Appl. No.: 13/863,414

(22) Filed: Apr. 16, 2013

(65) Prior Publication Data

US 2013/0303097 A1    Nov. 14, 2013

(30) Foreign Application Priority Data

May 8, 2012    (JP) .................................. 2012-106394

(51) Int. Cl.
| | |
|---|---|
| H04B 1/40 | (2006.01) |
| H04B 1/26 | (2006.01) |
| H04H 40/00 | (2008.01) |

(52) U.S. Cl.
CPC . *H04B 1/26* (2013.01); *H04H 40/00* (2013.01)
USPC .................. 455/86; 455/85; 455/57; 331/181

(58) Field of Classification Search
USPC ......... 455/86, 85, 87, 146, 147, 151.3, 196.1, 455/208, 209, 236.1, 255, 258; 331/181, 331/179, 49
See application file for complete search history.

(56) References Cited

U.S. PATENT DOCUMENTS

| | | | | |
|---|---|---|---|---|
| 5,821,820 | A * | 10/1998 | Snider et al. ..................... | 331/48 |
| 5,852,384 | A * | 12/1998 | Sakakura et al. ................ | 331/48 |
| 7,154,342 | B2 * | 12/2006 | Munker et al. .................. | 331/11 |
| 7,190,236 | B2 * | 3/2007 | Lee et al. .................. | 331/117 R |
| 7,249,368 | B2 * | 7/2007 | Maejima et al. ................ | 725/68 |
| 7,567,610 | B2 * | 7/2009 | Adan et al. ..................... | 375/219 |
| 8,139,160 | B2 * | 3/2012 | Wang et al. .................... | 348/731 |
| 2001/0045994 | A1* | 11/2001 | Maejima et al. .............. | 348/731 |
| 2005/0117664 | A1* | 6/2005 | Adan et al. ..................... | 375/316 |
| 2006/0152290 | A1* | 7/2006 | Lee et al. ........................ | 331/16 |
| 2011/0057837 | A1* | 3/2011 | Lin .......................... | 342/357.72 |
| 2014/0254710 | A1* | 9/2014 | Soe ............................... | 375/295 |

FOREIGN PATENT DOCUMENTS

JP        04-177921        6/1992

* cited by examiner

*Primary Examiner* — Minh D Dao
(74) *Attorney, Agent, or Firm* — Rader, Fishman & Grauer PLLC

(57) ABSTRACT

In a receiving device, an oscillating section generates a local oscillating signal for performing frequency conversion of one reception target channel of channels in broadcasting in a first frequency band and channels in broadcasting in a second frequency band; a first receiving section generates a channel signal based on the local oscillating signal and a high-frequency signal in the first frequency band when the reception target channel is a channel in the first frequency band, and does not perform the generation when the reception target channel is a channel in the second frequency band; and second receiving section generates a channel signal based on the local oscillating signal and a high-frequency signal in the second frequency band when the reception target channel is a channel in the second frequency band, and does not perform the generation when the reception target channel is a channel in the first frequency band.

10 Claims, 11 Drawing Sheets

FIG. 5

| RECEPTION MODE | VOLTAGE OF SATELLITE CONTROL LINE 142 | VOLTAGE OF TERRESTRIAL CONTROL LINE 141 |
|---|---|---|
| TERRESTRIAL (SATELLITE STOP) | High | Low |
| SATELLITE (TERRESTRIAL STOP) | Low | High |
| TOTAL STOP | High | High |

F I G . 9
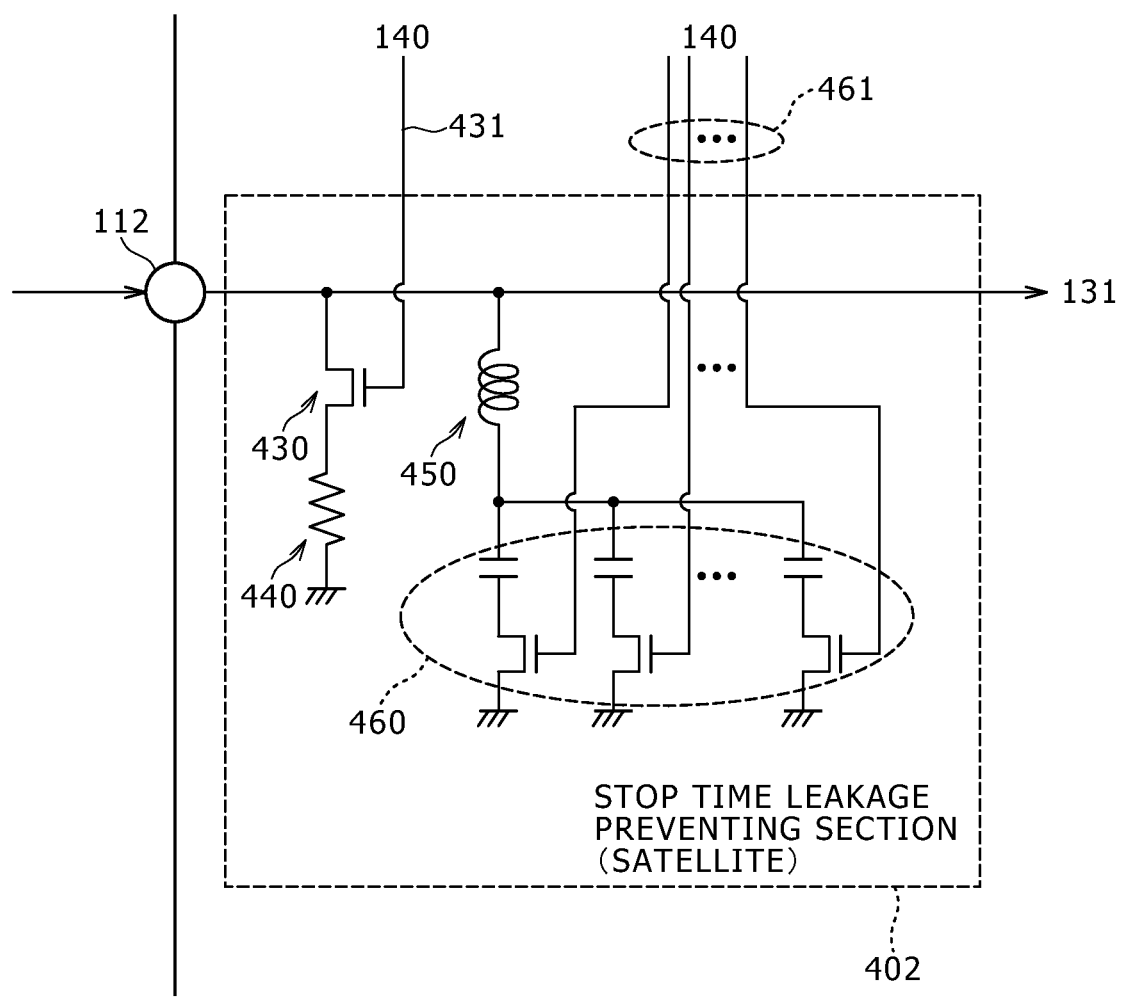

RECEIVING DEVICE AND SEMICONDUCTOR INTEGRATED CIRCUIT

BACKGROUND

The present technology relates to a receiving device, and particularly to a receiving device for receiving two broadcasts and a semiconductor integrated circuit.

Recently, a receiving module having both of a function of receiving terrestrial broadcasting and a function of receiving satellite broadcasting has been realized, and provided in a device capable of reproducing terrestrial broadcasting and satellite broadcasting (a television, a video recorder, a set-top box, or the like). This receiving module is for example realized by mounting an IC (Integrated Circuit) dedicated to processing for terrestrial broadcasting and an IC dedicated to processing for satellite broadcasting.

Incidentally, a tuner circuit device has been proposed which has a function of receiving terrestrial broadcasting and a function of receiving satellite broadcasting in one IC in order to decrease an IC mounting area, decrease the cost of peripheral parts, and reduce module size, for example (see Japanese Patent Laid-Open No. Hei 04-177921, for example).

SUMMARY

In the above-described technology in related art, a tuner circuit can be designed using a mixer IC having a mixer function for terrestrial broadcasting and a mixer function for satellite broadcasting.

Incidentally, in the above-described technology in related art, the mixer IC and a processing circuit (an amplifying circuit and a filter circuit) subsequent to the mixer IC are common to terrestrial broadcasting and satellite broadcasting. However, because of respective different frequency ranges of terrestrial broadcasting and satellite broadcasting, it may be difficult to provide the processing circuit delivering optimum performance for both of terrestrial broadcasting and satellite broadcasting in the common part. In addition, when a high-performance circuit capable of dealing with a very wide range of bands which circuit delivers optimum performance for both of terrestrial broadcasting and satellite broadcasting is provided, there is a possibility of an increase in circuit cost and an increase in power consumption.

It is accordingly important to make a receiving device having both of a function of receiving terrestrial broadcasting and a function of receiving satellite broadcasting deliver optimum performance in each of both the receptions. In this case, it is important to realize a tuner circuit device in which an IC mounting area is reduced, the cost of peripheral parts is reduced, and module size is decreased, for example.

The present technology has been created in view of such a situation. It is desirable to make a receiving device having functions of receiving two broadcasts deliver appropriate performance.

According to a first embodiment of the present technology, there is provided a receiving device including: an oscillating section configured to generate a local oscillating signal for performing frequency conversion of one reception target channel of channels in broadcasting using a first frequency band and channels in broadcasting using a second frequency band different from the first frequency band; a first receiving section configured to perform generation of a channel signal for obtaining broadcasting output of the reception target channel on a basis of the generated local oscillating signal and a high-frequency signal in the first frequency band when the reception target channel is a channel in the first frequency band, and not to perform the generation when the reception target channel is a channel in the second frequency band; and a second receiving section configured to perform generation of the channel signal on a basis of the generated local oscillating signal and a high-frequency signal in the second frequency band when the reception target channel is a channel in the second frequency band, and not to perform the generation when the reception target channel is a channel in the first frequency band. This produces an effect of receiving one of the channels in the first frequency band and the channels in the second frequency band using the local oscillating signal generated by the common oscillating section.

In addition, in the first embodiment, the receiving device may further include a noise leakage preventing section configured to prevent noise occurring in the receiving device from leaking into an antenna wire transmitting the high-frequency signal in the first frequency band. This produces an effect of preventing the noise from leaking into the antenna wire transmitting the high-frequency signal in the first frequency band.

In addition, in the first embodiment, the noise leakage preventing section may be formed by a transistor disposed on a path through which the high-frequency signal in the first frequency band and the noise pass, the transistor may be set in a conducting state when the reception target channel is a channel in the first frequency band, and the transistor may be set in a nonconducting state when the reception target channel is a channel in the second frequency band. This produces an effect of making the transistor disposed on the path through which the high-frequency signal in the first frequency band and the noise pass prevent the noise from leaking.

In addition, in the first embodiment, the noise leakage preventing section may be formed by a resonance circuit connected in parallel with a path through which the high-frequency signal in the first frequency band and the noise pass, the resonance circuit may resonate according to a capacitance of a magnitude corresponding to a frequency of the local oscillating signal when the reception target channel is a channel in the second frequency band, and the resonance circuit may be prevented from resonating when the reception target channel is a channel in the first frequency band. This produces an effect of making the resonance circuit connected in parallel with the path through which the high-frequency signal in the first frequency band and the noise pass prevent the noise from leaking.

In addition, in the first embodiment, when the reception target channel is a channel in the second frequency band, the noise leakage preventing section may supply a signal of opposite phase to noise occurring in the oscillating section to a path through which the high-frequency signal in the first frequency band and the noise pass. This produces an effect of preventing the noise from leaking by supplying the signal of opposite phase to the noise to the path through which the high-frequency signal in the first frequency band and the noise pass.

In addition, in the first embodiment, the noise leakage preventing section may include an impedance maintaining circuit for maintaining impedance at an input terminal for inputting the high-frequency signal in the first frequency band to the receiving device at a predetermined value. This produces an effect of maintaining the impedance at the input terminal for inputting the high-frequency signal in the first frequency band to the receiving device at the predetermined value.

In addition, in the first embodiment, the receiving device may further include at least one of a noise leakage preventing section configured to prevent noise occurring in the receiving device from leaking into an antenna wire transmitting the high-frequency signal in the first frequency band and a noise leakage preventing section configured to prevent the noise occurring in the receiving device from leaking into an antenna wire transmitting the high-frequency signal in the second frequency band. This produces an effect of providing at least one of the noise leakage preventing section configured to prevent the noise from leaking into the antenna wire transmitting the high-frequency signal in the first frequency band and the noise leakage preventing section configured to prevent the noise from leaking into the antenna wire transmitting the high-frequency signal in the second frequency band.

In addition, in the first embodiment, one of a frequency band of terrestrial broadcasting and a frequency band of satellite broadcasting may be the first frequency band, and the other may be the second frequency band. This produces an effect of a channel of terrestrial broadcasting or satellite broadcasting being received by the receiving device.

In addition, in the first embodiment, the oscillating section, the first receiving section, and the second receiving section may be incorporated in one semiconductor integrated circuit. This produces an effect of one of the channels in the first frequency band and the channels in the second frequency band being received by the semiconductor integrated circuit in which the oscillating section, the first receiving section, and the second receiving section are packaged into one.

In addition, according to a second embodiment of the present technology, there is provided a semiconductor integrated circuit including: an oscillating section configured to generate a local oscillating signal for performing frequency conversion of one reception target channel of channels in broadcasting using a first frequency band and channels in broadcasting using a second frequency band different from the first frequency band; a first receiving section configured to perform generation of a channel signal for obtaining broadcasting output of the reception target channel on a basis of the generated local oscillating signal and a high-frequency signal in the first frequency band when the reception target channel is a channel in the first frequency band, and not to perform the generation but to prevent noise occurring in the receiving device from leaking into an antenna wire transmitting the high-frequency signal in the first frequency band when the reception target channel is a channel in the second frequency band; and a second receiving section configured to perform generation of the channel signal on a basis of the generated local oscillating signal and a high-frequency signal in the second frequency band when the reception target channel is a channel in the second frequency band, and not to perform the generation when the reception target channel is a channel in the first frequency band. This produces an effect of receiving one of the channels in the first frequency band and the channels in the second frequency band using the local oscillating signal generated by the common oscillating section, and preventing the noise from leaking into the antenna wire transmitting the high-frequency signal in the first frequency band when a channel in the second frequency band is received.

According to the present technology, an excellent effect can be produced in that a receiving device having functions of receiving two broadcasts can be made to deliver appropriate performance.

BRIEF DESCRIPTION OF THE DRAWINGS

FIG. 5 is a table showing relation between the voltages of a terrestrial control line and a satellite control line and states of operation (reception modes) of the integrated circuit in the first embodiment of the present technology;

FIG. 9 is a schematic diagram showing an example of circuit configuration of a stop time leakage preventing section (satellite) in a second embodiment of the present technology;

DETAILED DESCRIPTION OF THE PREFERRED EMBODIMENTS

A mode for carrying out the present technology (which mode will hereinafter be referred to as embodiments) will hereinafter be described. Description will be made in the following order.

1. First Embodiment (Reception Control: Example of Integrated Circuit for Receiving One of Channels of Terrestrial Broadcasting and Satellite Broadcasting)

2. Second Embodiment (Reception Control: Example of Reducing Noise by LC Resonance Circuit)

3. Third Embodiment (Reception Control: Example of Reducing Noise by Signal of Opposite Phase)

<1. First Embodiment>
[Example of Functional Configuration of Integrated Circuit]

Figure 1:
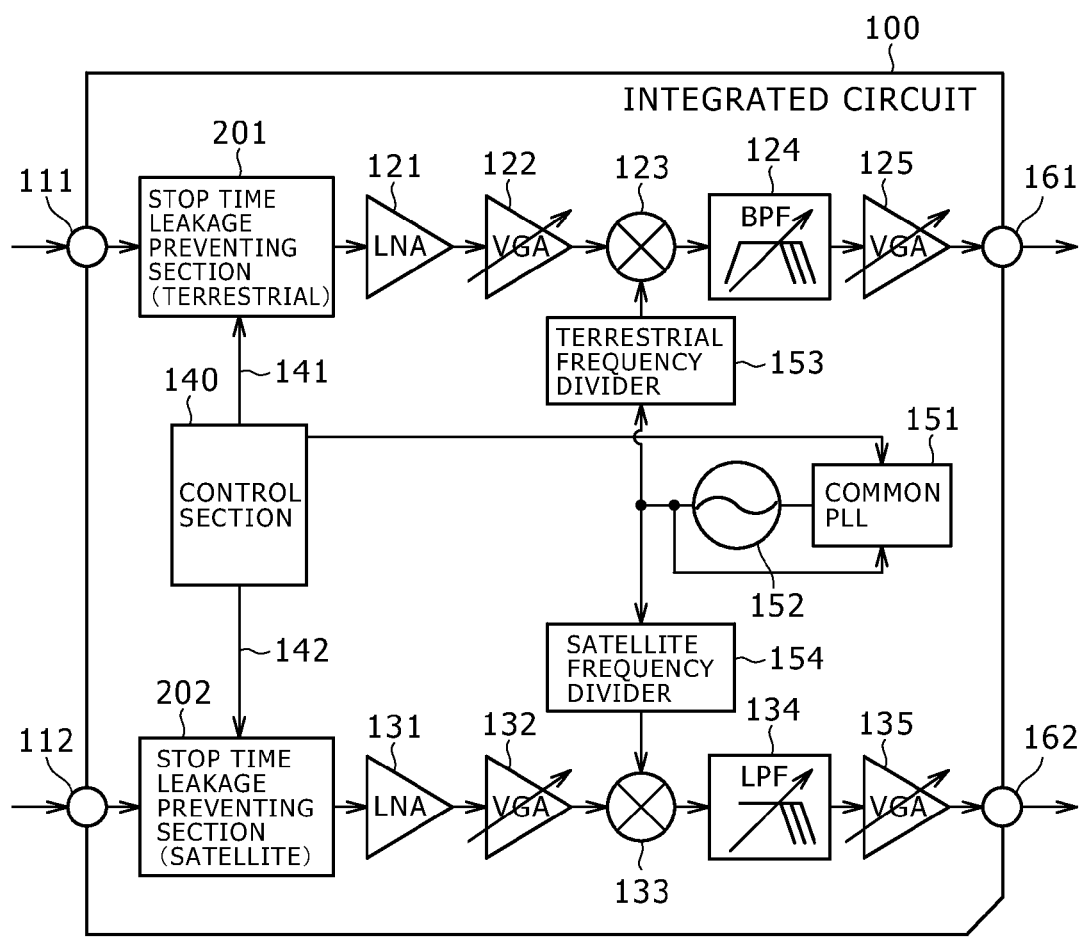
FIG. 1 is a block diagram showing an example of functional configuration of a receiving module (integrated circuit) in a first embodiment of the present technology.

FIG. 1 is a block diagram showing an example of functional configuration of a receiving module (integrated circuit 100) in a first embodiment of the present technology.

Incidentally, in the first embodiment of the present technology, description will be made supposing that the integrated circuit 100 has a receiving section (tuner) for terrestrial broadcasting and a receiving section (tuner) for satellite broadcasting on one chip (IC: Integrated Circuit). This chip (integrated circuit 100) is for example provided in a device (a television, a video recorder, a set-top box, or the like) capable of reproducing terrestrial broadcasting and satellite broadcasting.

In the following, a signal supplied from an antenna for terrestrial broadcasting to the integrated circuit 100 will be referred to as a terrestrial RF (Radio Frequency: high frequency) signal. In addition, a signal supplied from an antenna for satellite broadcasting to the integrated circuit 100 (signal already converted into an IF (Intermediate Frequency) band of about 950 to 2150 MHz) will be referred to as a satellite RF signal.

The integrated circuit 100 includes a control section 140. The integrated circuit 100 also includes a common PLL (Phase Locked Loop) 151, a common VCO (Voltage Controlled Oscillator) 152, a terrestrial frequency divider 153, and a satellite frequency divider 154 as a circuit configuration for generating a local oscillating signal.

In addition, the integrated circuit 100 includes a terrestrial RF signal input terminal 111, a stop time leakage preventing section (terrestrial) 201, an LNA (Low Noise Amplifier) 121, and a VGA (Variable Gain Amplifier) 122 as a circuit configuration for subjecting the terrestrial RF signal to signal processing. In addition, the integrated circuit 100 includes a mixer 123, a BPF (Band Pass Filter: a complex band pass filter) 124, a VGA 125, and a terrestrial IF (Intermediate Frequency) signal output terminal 161 as a configuration for subjecting the terrestrial RF signal to signal processing.

The integrated circuit 100 further includes a satellite RF signal input terminal 112, a stop time leakage preventing section (satellite) 202, an LNA 131, a VGA 132, and a mixer 133 as a circuit configuration for subjecting the satellite RF signal to signal processing. The integrated circuit 100 further includes an LPF (low pass filter) 134, a VGA 135, and a satellite BB (Baseband) signal output terminal 162 as a configuration for subjecting the satellite RF signal to signal processing.

The control section 140 controls the operation of various parts in the integrated circuit 100. The control section 140 for example receives information on the selection of a channel from a control section (not shown) of the device in which the integrated circuit 100 is provided, and controls the operation of the various parts in the integrated circuit 100 according to the information. When a channel of terrestrial broadcasting is selected, the control section 140 makes the circuit that subjects the terrestrial RF signal to signal processing operate by supplying power to the circuit that subjects the terrestrial RF signal to signal processing, and stops the operation of the circuit that subjects the satellite RF signal to signal processing by not supplying power to the circuit that subjects the satellite RF signal to signal processing. When a channel of satellite broadcasting is selected, the control section 140 makes the circuit that subjects the satellite RF signal to signal processing operate by supplying power to the circuit that subjects the satellite RF signal to signal processing, and stops the operation of the circuit that subjects the terrestrial RF signal to signal processing by not supplying power to the circuit that subjects the terrestrial RF signal to signal processing.

In addition, the control section 140 supplies the common PLL 151 with a signal for making the common PLL 151 oscillate according to the selected channel (oscillation frequency control signal). Further, the control section 140 makes the stop time leakage preventing section provided to the circuit that is not performing signal processing operate so as to prevent noise occurring in the integrated circuit 100 from leaking from the input terminal.

The common PLL 151 and the common VCO 152 are a local oscillator (LO) common to the mixer 123 for the terrestrial RF signal and the mixer 133 for the satellite RF signal. The common PLL 151 oscillates according to the oscillation frequency control signal supplied from the control section 140, and the common VCO 152 further amplifies the frequency of the local oscillating signal generated by the oscillation. The local oscillating signal whose frequency is further amplified by the common VCO 152 is supplied to the terrestrial frequency divider 153 and the satellite frequency divider 154. Incidentally, the local oscillating signal whose frequency is further amplified by the common VCO 152 is supplied to the common PLL 151 to perform feedback control of the oscillation frequency of the common PLL 151.

The terrestrial frequency divider 153 generates a local oscillating signal for frequency conversion of the terrestrial RF signal. The terrestrial frequency divider 153 has a variable frequency division ratio. When the integrated circuit 100 subjects the terrestrial RF signal to signal processing, the frequency division ratio corresponding to the reception target channel is set in the terrestrial frequency divider 153. The terrestrial frequency divider 153 frequency-divides the local oscillating signal supplied from the common VCO 152, and supplies the frequency-divided local oscillating signal to the mixer 123. Incidentally, the terrestrial frequency divider 153 does not perform the frequency-dividing operation when the integrated circuit 100 subjects the satellite RF signal to signal processing.

The satellite frequency divider 154 generates a local oscillating signal for frequency conversion of the satellite RF signal. The satellite frequency divider 154 is similar to the terrestrial frequency divider 153 except that the range of a frequency division ratio that can be set in the satellite frequency divider 154 is different from that of the terrestrial frequency divider 153. Specifically, the satellite frequency divider 154 is a variable frequency divider, and when the integrated circuit 100 subjects the satellite RF signal to signal processing, the satellite frequency divider 154 frequency-divides the local oscillating signal supplied from the common VCO 152, and supplies the frequency-divided local oscillating signal to the mixer 133. Incidentally, the satellite frequency divider 154 does not perform the frequency-dividing operation when the integrated circuit 100 subjects the terrestrial RF signal to signal processing. Incidentally, the common PLL 151, the common VCO 152, the terrestrial frequency divider 153, and the satellite frequency divider 154 are an example of an oscillating section described in claims.

Thus, in the integrated circuit 100, the local oscillating signal generated by the common PLL 151 and the common VCO 152 are frequency-divided by the frequency dividers, and frequency conversion is performed using the frequency-divided local oscillating signals. Thereby, even when the range of the oscillation frequency of the common PLL 151 is not so wide as to cover all of the frequency bands of both of terrestrial broadcasting and satellite broadcasting, the local oscillating signals can be generated so as to cover all of the frequency bands of both of terrestrial broadcasting and satellite broadcasting.

The circuit configuration for subjecting the terrestrial RF signal to signal processing will next be described. Incidentally, referring to FIG. 1, description will be made of an example in which the terrestrial RF signal is subjected to signal processing by a system of generating an IF signal of a low frequency (Low-IF system).

The terrestrial RF signal input terminal 111 is a terminal for the integrated circuit 100 to receive the terrestrial RF signal supplied from the antenna for receiving terrestrial broadcasting. For example, the terrestrial RF signal input terminal 111 receives a signal from which signals in bands other than that of the terrestrial RF signal are removed among the signals input to the antenna input terminal of the device in which the integrated circuit 100 is provided. That is, a signal (terrestrial RF signal) in a terrestrial frequency band (about 42 to 1002 MHz) is input to the terrestrial RF signal input terminal 111. The terrestrial RF signal input to the terrestrial RF signal input terminal 111 is supplied to the stop time leakage preventing section (terrestrial) 201.

The stop time leakage preventing section (terrestrial) 201 is to prevent noise from leaking to the outside of the integrated circuit 100 via the terrestrial RF signal input terminal 111. The stop time leakage preventing section (terrestrial) 201 is controlled by a signal supplied from the control section 140 via a terrestrial control line 141. When the integrated circuit 100 subjects the terrestrial RF signal to signal processing, the stop time leakage preventing section (terrestrial) 201 supplies the terrestrial RF signal supplied from the terrestrial RF signal input terminal 111 to the LNA 121. When the circuit that subjects the terrestrial RF signal to signal processing is in a stopped state (when the integrated circuit 100 subjects the satellite RF signal to signal processing), the stop time leakage preventing section (terrestrial) 201 prevents noise from leaking to the outside of the integrated circuit 100.

The LNA 121 is a low-noise amplifier circuit. The LNA 121 amplifies the terrestrial RF signal supplied from the stop time leakage preventing section (terrestrial) 201 with low noise, and supplies the amplified terrestrial RF signal to the VGA 122.

The VGA 122 is a variable gain amplifier for amplifying the terrestrial RF signal. The VGA 122 amplifies or attenuates the terrestrial RF signal supplied from the LNA 121 to a level appropriate for processing by the mixer 123. The VGA 122 supplies the processed terrestrial RF signal to the mixer 123.

The mixer 123 frequency-converts the terrestrial RF signal into an IF signal (terrestrial IF signal) of a low frequency by multiplying together the terrestrial RF signal supplied from the VGA 122 and the local oscillating signal supplied from the terrestrial frequency divider 153. The mixer 123 supplies the generated terrestrial IF signal to the BPF 124.

The BPF 124 is a complex band-pass filter for removing an image interference wave included in the terrestrial IF signal supplied from the mixer 123, and selectively transmitting the signal of the reception target channel (desired wave signal). That is, the BPF 124 generates a terrestrial IF signal formed only by the signal of the reception target channel. The BPF 124 supplies the terrestrial IF signal (channel signal) including only the desired wave signal to the VGA 125.

The VGA 125 is a variable gain amplifier for amplifying the terrestrial IF signal. The VGA 125 amplifies the terrestrial IF signal including only the desired wave signal which terrestrial IF signal is supplied from the BPF 124 to a level appropriate for output from the terrestrial IF signal output terminal 161. That is, the VGA 125 amplifies the terrestrial IF signal according to the input level of a circuit supplied with the terrestrial IF signal from the integrated circuit 100. The VGA 125 supplies the amplified terrestrial IF signal to the terrestrial IF signal output terminal 161. Incidentally, the LNA 121, the VGA 122, the mixer 123, the BPF 124, and the VGA 125 are an example of a first receiving section or a second receiving section described in claims.

The terrestrial IF signal output terminal 161 is a terminal for outputting the terrestrial IF signal from the integrated circuit 100. For example, the terrestrial IF signal output terminal 161 supplies the terrestrial IF signal to a demodulating section (not shown) for demodulating the terrestrial IF signal and generating a transport stream.

The circuit that subjects the satellite RF signal to signal processing will next be described. Incidentally, referring to FIG. 1, description will be made of an example in which the satellite RF signal is subjected to signal processing by a system of directly generating a baseband (direct conversion system (Zero-IF system)).

The satellite RF signal input terminal 112 is a terminal for the integrated circuit 100 to receive the satellite RF signal supplied from the antenna for receiving satellite broadcasting. For example, the satellite RF signal input terminal 112 receives a signal from which signals in bands other than that of the satellite RF signal are removed among the signals input to the antenna input terminal of the device in which the integrated circuit 100 is provided. That is, a signal (satellite RF signal) in a satellite frequency band (about 950 to 2150 MHz) is input to the satellite RF signal input terminal 112. The satellite RF signal input to the satellite RF signal input terminal 112 is supplied to the stop time leakage preventing section (satellite) 202.

The stop time leakage preventing section (satellite) 202 is to prevent noise from leaking to the outside of the integrated circuit 100 via the satellite RF signal input terminal 112. Incidentally, the stop time leakage preventing section (satellite) 202 is similar to the stop time leakage preventing section (terrestrial) 201. The stop time leakage preventing section (satellite) 202 is controlled by a signal supplied from the control section 140 via a satellite control line 142. When the integrated circuit 100 subjects the satellite RF signal to signal processing, the stop time leakage preventing section (satellite) 202 supplies the satellite RF signal supplied from the satellite RF signal input terminal 112 to the LNA 131. When the circuit that subjects the satellite RF signal to signal processing is in a stopped state (when the integrated circuit 100 subjects the terrestrial RF signal to signal processing), the stop time leakage preventing section (satellite) 202 prevents noise from leaking to the outside of the integrated circuit 100. Incidentally, the stop time leakage preventing section (satellite) 202 will be described with reference to FIGS. 3 to 7, and therefore detailed description thereof will be omitted here. Incidentally, the stop time leakage preventing section (terrestrial) 201 and the stop time leakage preventing section (satellite) 202 are an example of a noise leakage preventing section described in claims.

The LNA 131 is a low-noise amplifier circuit. The LNA 131 amplifies the satellite RF signal supplied from the stop time leakage preventing section (satellite) 202 with low noise, and supplies the amplified satellite RF signal to the VGA 132.

The VGA 132 is a variable gain amplifier for amplifying the satellite RF signal. The VGA 132 amplifies or attenuates the satellite RF signal supplied from the LNA 131 to a level appropriate for processing by the mixer 133. The VGA 132 supplies the processed satellite RF signal to the mixer 133.

The mixer 133 frequency-converts the satellite RF signal into a signal of a baseband frequency by multiplying together the satellite RF signal supplied from the VGA 132 and the local oscillating signal supplied from the satellite frequency divider 154. The mixer 133 supplies the generated signal (satellite BB signal) to the LPF 134.

The LPF 134 is a low-pass filter for selectively transmitting the signal of the reception target channel (desired wave signal) which signal is included in the satellite BB signal supplied from the mixer 133. That is, the LPF 134 generates a satellite BB signal formed only by the signal of the reception target channel. The LPF 134 supplies the satellite BB signal (channel signal) including only the desired wave signal to the VGA 135.

The VGA 135 is a variable gain amplifier for amplifying the satellite BB signal. The VGA 135 amplifies the satellite BB signal including only the desired wave signal which satellite BB signal is supplied from the LPF 134 to a level appropriate for output from the satellite BB signal output terminal 162. That is, the VGA 135 amplifies the satellite BB signal according to the input level of the circuit supplied with the satellite BB signal from the integrated circuit 100. The VGA 135 supplies the amplified satellite BB signal to the satellite BB signal output terminal 162. Incidentally, the LNA 131, the VGA 132, the mixer 133, the LPF 134, and the VGA 135 are an example of a second receiving section or a first receiving section described in claims.

The satellite BB signal output terminal 162 is a terminal for outputting the satellite BB signal from the integrated circuit 100. For example, the satellite BB signal output terminal 162 supplies the satellite BB signal to the demodulating section (not shown).

A signal flow at the time of generating the terrestrial IF signal and a signal flow at the time of generating the satellite BB signal will next be described with reference to FIGS. 2A and 2B.

[Example of Switching Operation when Terrestrial IF Signal and Satellite BB Signal are Generated]

Figure 2A:
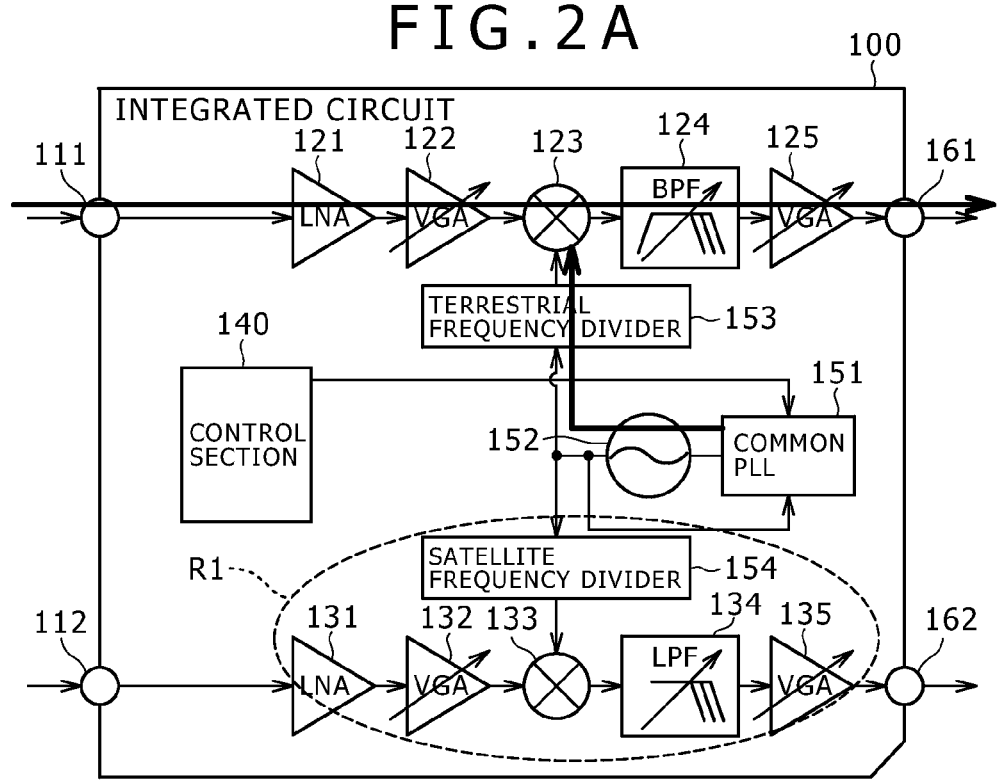
FIGS. 2A and 2B are diagrams schematically showing a signal flow when the integrated circuit in the first embodiment of the present technology generates a terrestrial IF signal and a signal flow when the integrated circuit in the first embodiment of the present technology generates a satellite BB signal.
Figure 2B:
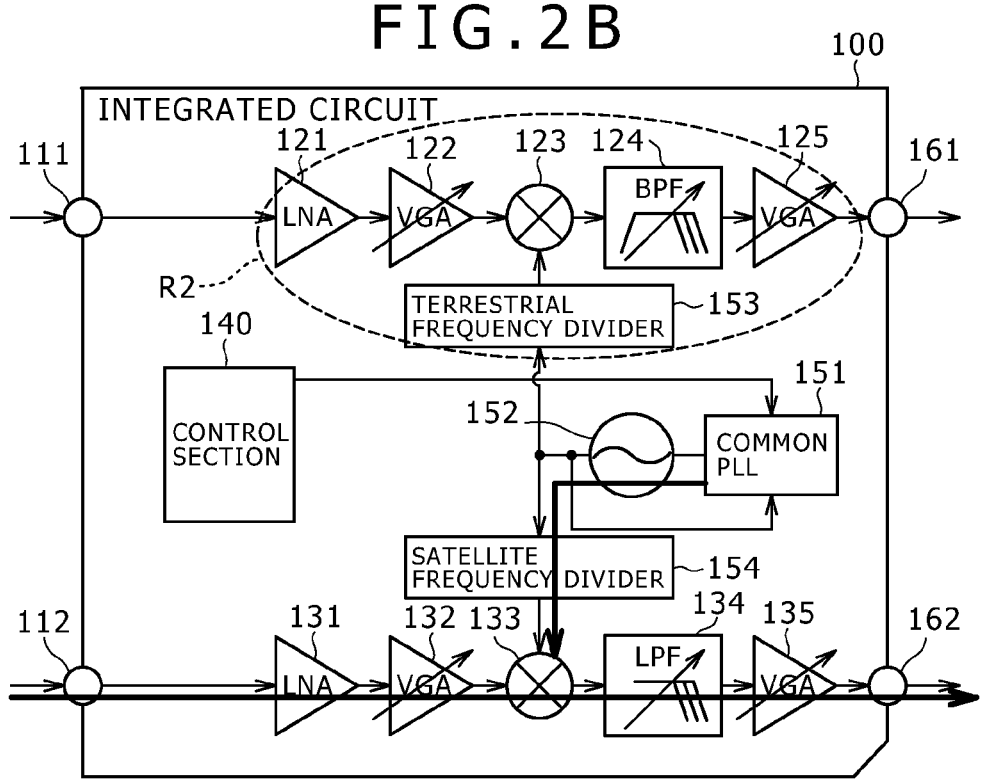

FIGS. 2A and 2B are diagrams schematically showing a signal flow when the integrated circuit 100 in the first embodiment of the present technology generates the terrestrial IF signal and a signal flow when the integrated circuit 100 in the first embodiment of the present technology generates the satellite BB signal.

FIG. 2A schematically shows a signal flow when the terrestrial RF signal is subjected to signal processing to generate the terrestrial IF signal. FIG. 2B schematically shows a signal flow when the satellite RF signal is subjected to signal processing to generate the satellite BB signal.

Incidentally, in order to make description in the following of operation of the integrated circuit 100 without considering the operation of the stop time leakage preventing sections, FIGS. 2A and 2B show the integrated circuit 100 from which the stop time leakage preventing section (terrestrial) 201 and the stop time leakage preventing section (satellite) 202 are omitted.

Description will first be made of a case of generating the terrestrial IF signal. When the terrestrial IF signal is generated, the supply of power to the circuit that subjects the satellite RF signal to signal processing is cut off, so that the circuit that subjects the satellite BB signal to signal processing (function indicated by a frame R1 in FIG. 2A) stops operation. Therefore, the integrated circuit 100 subjects only the terrestrial RF signal to signal processing, and outputs the terrestrial IF signal of a desired wave from the terrestrial IF signal output terminal 161.

Description will next be made of a case of generating the satellite BB signal. When the satellite BB signal is generated, the supply of power to the circuit that subjects the terrestrial RF signal to signal processing is cut off, so that the circuit that subjects the terrestrial RF signal to signal processing (function indicated by a frame R2 in FIG. 2B) stops operation. Therefore, the integrated circuit 100 subjects only the satellite BB signal to signal processing, and outputs the satellite BB signal of a desired wave from the satellite BB signal output terminal 162.

Thus, the integrated circuit 100 includes the circuit dedicated to signal processing for terrestrial broadcasting (the LNA 121, the VGA 122, the mixer 123, the BPF 124, and the VGA 125) and the circuit dedicated to signal processing for satellite broadcasting (the LNA 131, the VGA 132, the mixer 133, the LPF 134, and the VGA 135). That is, the circuit from the input of the terrestrial RF signal to the output of the terrestrial IF signal is completely independent of the circuit from the input of the satellite RF signal to the output of the satellite BB signal. It is thereby possible to reduce a load of considering conditions for optimization to be performed in achieving commonality.

In addition, when the integrated circuit 100 is operated, one of the circuit dedicated to signal processing for terrestrial broadcasting and the circuit dedicated to signal processing for satellite broadcasting stops operation. That is, the operation of one of the circuit dedicated to signal processing for terrestrial broadcasting and the circuit dedicated to signal processing for satellite broadcasting does not affect the operation of the other.

In addition, by providing separate frequency-dividers for terrestrial waves and satellite waves to generate the local oscillating signals to be used at the time of multiplication, it is possible to achieve commonality of the PLL and the VCO, and thus reduce an IC area (miniaturization).

Description will next be made of the stop time leakage preventing section (terrestrial) 201 and the stop time leakage preventing section (satellite) 202.

[Example of Circuit Configuration of Stop Time Leakage Preventing Section (Satellite)]

Figure 3:
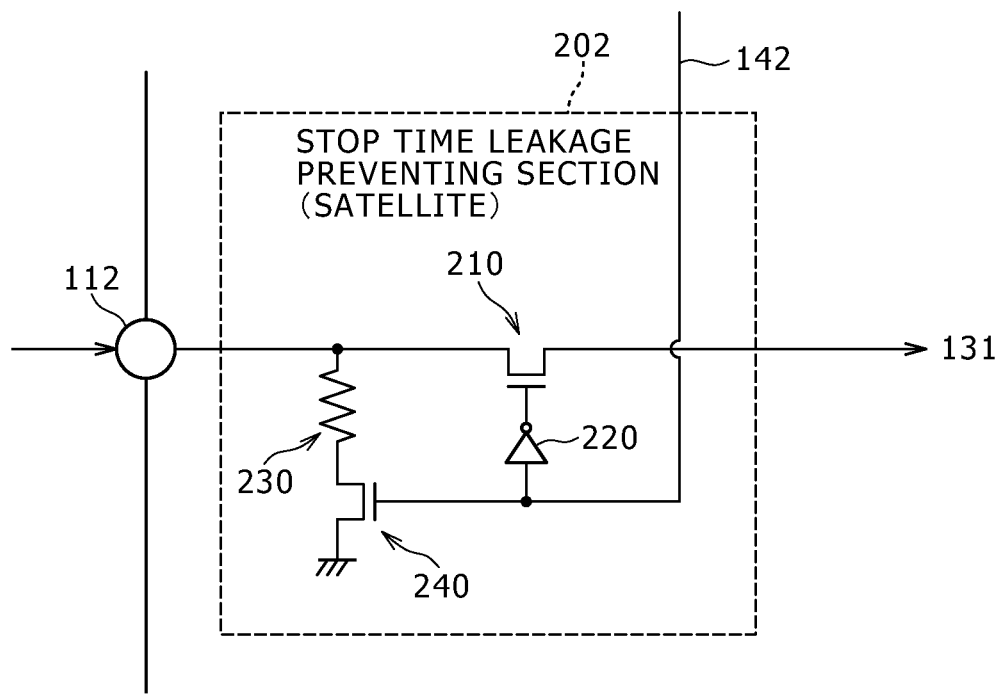
FIG. 3 is a schematic diagram showing an example of circuit configuration of a stop time leakage preventing section (satellite) in the first embodiment of the present technology.

FIG. 3 is a schematic diagram showing an example of circuit configuration of the stop time leakage preventing section (satellite) 202 in the first embodiment of the present technology.

Incidentally, the stop time leakage preventing section (terrestrial) 201 is similar to the stop time leakage preventing section (satellite) 202 except for the position where the stop time leakage preventing section (terrestrial) 201 is connected, and therefore description thereof will be omitted.

The stop time leakage preventing section (satellite) 202 includes a series transistor 210, a NOT circuit 220, a resistance 230, and a grounding transistor 240.

The NOT circuit 220 inverts the voltage (potential) of the signal supplied via the satellite control line 142, and supplies the inverted voltage to the series transistor 210. Incidentally, the voltage of the satellite control line 142 is binary (high and low). That is, the NOT circuit 220 supplies a low voltage to the series transistor 210 when the voltage of the satellite control line 142 is high, and supplies a high voltage to the series transistor 210 when the voltage of the satellite control line 142 is low. This makes the operation of the series transistor 210 in response to the voltage of the satellite control line 142 opposite to the operation of the grounding transistor 240 in response to the voltage of the satellite control line 142.

The series transistor 210 is a switch for controlling a state of connection between the satellite RF signal input terminal 112 and the LNA 131. The series transistor 210 is for example formed by an nMOS (negative channel Metal Oxide Semiconductor) transistor. The gate terminal of the series transistor 210 is supplied with the output of the NOT circuit 220. When the potential of the satellite control line 142 is low, the series transistor 210 produces a conducting state between the satellite RF signal input terminal 112 and the LNA 131. When the potential of the satellite control line 142 is high, on the other hand, the series transistor 210 produces a nonconducting state between the satellite RF signal input terminal 112 and the LNA 131.

The grounding transistor 240 is a switch for performing on/off control of the grounding of the resistance 230. The grounding transistor 240 is for example formed by an nMOS transistor. The gate terminal of the grounding transistor 240 is connected to the satellite control line 142. The grounding transistor 240 is set in a nonconducting state when the potential of the satellite control line 142 is low, and is set in a conducting state when the potential of the satellite control line 142 is high.

The resistance 230 is to make terminal input impedance at the time of the conducting state of the series transistor 210 identical to that at the time of the nonconducting state of the series transistor 210. A resistance of 75Ω, for example, is provided as the resistance 230 when the input impedance of the LNA 131 is designed to be 75Ω (when matching is achieved at 75Ω). The resistance 230 maintains the input impedance at 75Ω when the grounding transistor 240 is in a conducting state. Incidentally, the grounding transistor 240 and the resistance 230 are an example of an impedance maintaining circuit described in claims.

Relation between the voltage of the satellite control line 142 and states of operation of the stop time leakage preventing section (satellite) 202 will next be described with reference to FIGS. 4A and 4B.

[Example of States of Operation of Stop Time Leakage Preventing Section (Satellite)]

Figure 4A:
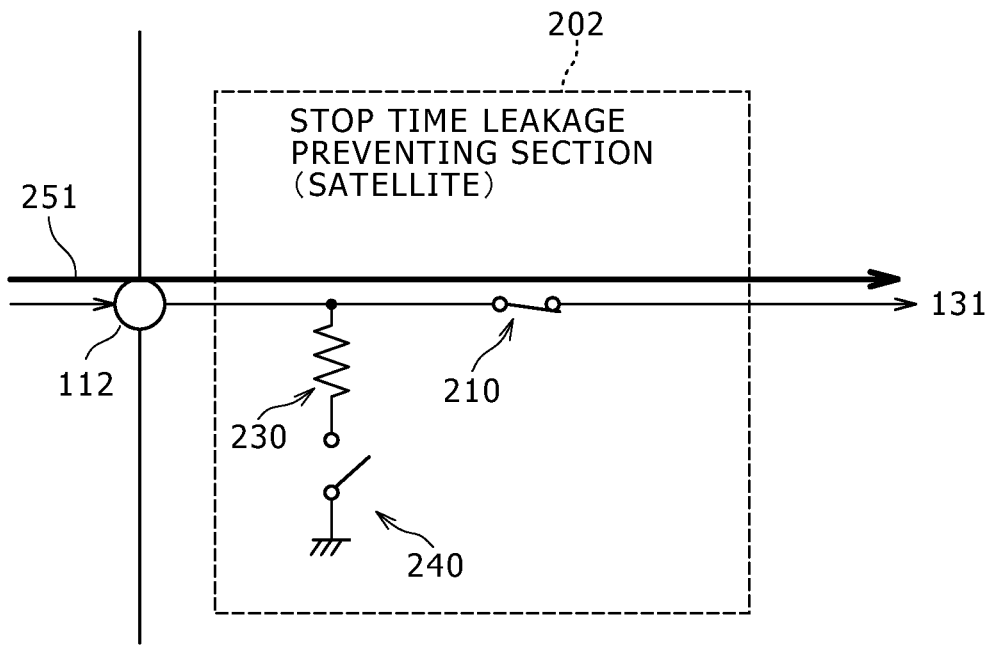
FIGS. 4A and 4B are diagrams schematically showing an example of states of operation of the stop time leakage preventing section (satellite) in the first embodiment of the present technology.
Figure 4B:
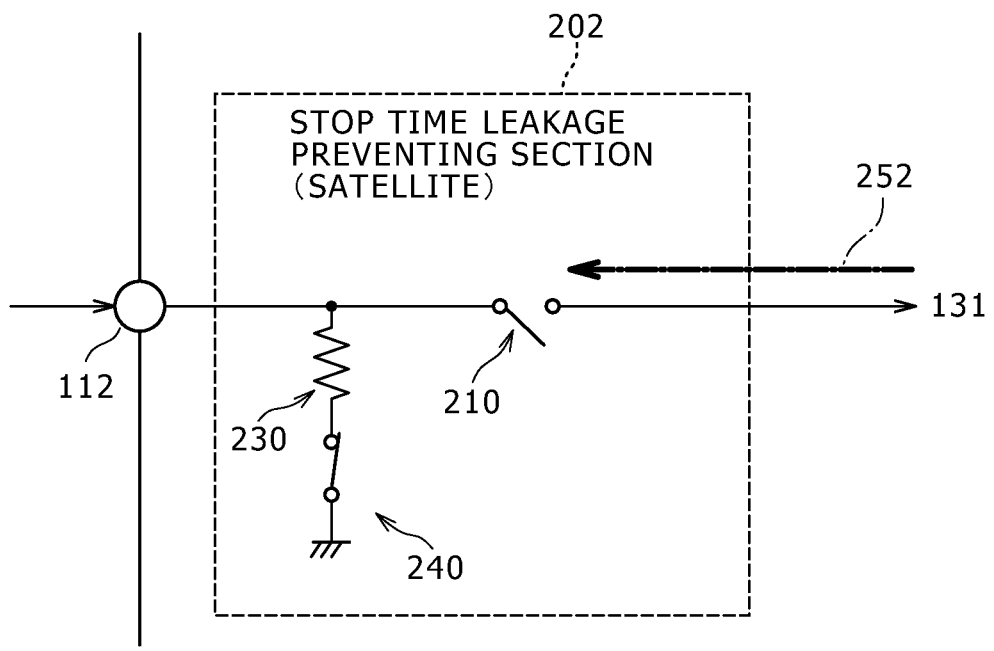

FIGS. 4A and 4B are diagrams schematically showing an example of states of operation of the stop time leakage preventing section (satellite) 202 in the first embodiment of the present technology.

FIG. 4A shows a state of operation of the stop time leakage preventing section (satellite) 202 when the voltage of the satellite control line 142 is low. FIG. 4B shows a state of operation of the stop time leakage preventing section (satellite) 202 when the voltage of the satellite control line 142 is high.

Incidentally, FIGS. 4A and 4B show the series transistor 210 and the grounding transistor 240 as switches, and do not show the satellite control line 142 nor the NOT circuit 220.

When the voltage of the satellite control line 142 is low, as shown in FIG. 4A, the series transistor 210 is in a conducting state, and the grounding transistor 240 is in a nonconducting state. The satellite RF signal thereby flows from the satellite RF signal input terminal 112 to the LNA 131. Incidentally, in FIG. 4A, the satellite RF signal flowing from the satellite RF signal input terminal 112 to the LNA 131 is represented by a solid line arrow (satellite RF signal 251).

When the voltage of the satellite control line 142 is high, as shown in FIG. 4B, the series transistor 210 is in a nonconducting state, and the grounding transistor 240 is in a conducting state. A flow of noise flowing to the satellite RF signal input terminal 112 within the integrated circuit 100 is thereby stopped by the series transistor 210. Specifically, noise accompanying the signal processing of the terrestrial RF signal and leakage noise caused in the common PLL 151 and the common VCO 152 can be prevented from leaking from the satellite RF signal input terminal 112 to the outside.

[Example of Voltage of Terrestrial Control Line and Satellite Control Line]

FIG. 5 is a table showing relation between the voltages of the terrestrial control line and the satellite control line and states of operation (reception modes) of the integrated circuit 100 in the first embodiment of the present technology.

As shown in the table of FIG. 5, in a mode (terrestrial) of processing the terrestrial RF signal, the voltage of the satellite control line 142 is high, and the voltage of the terrestrial control line 141 is low. The series transistor in the stop time leakage preventing section (satellite) 202 is thereby set in a nonconducting state, so that noise can be prevented from leaking from the satellite RF signal input terminal 112.

In a mode (satellite) of processing the satellite RF signal, on the other hand, the voltage of the satellite control line 142 is low, and the voltage of the terrestrial control line 141 is high. The series transistor in the stop time leakage preventing section (terrestrial) 201 is thereby set in a nonconducting state, so that noise can be prevented from leaking from the terrestrial RF signal input terminal 111.

Incidentally, when the integrated circuit 100 does not perform signal processing (total stop), the voltages of both of the satellite control line 142 and the terrestrial control line 141 are set high.

Noise caused by the local oscillating signal generating circuit (the common PLL 151 and the common VCO 152) will next be described with reference to FIG. 6.

[Example of Noise]

Figure 6:
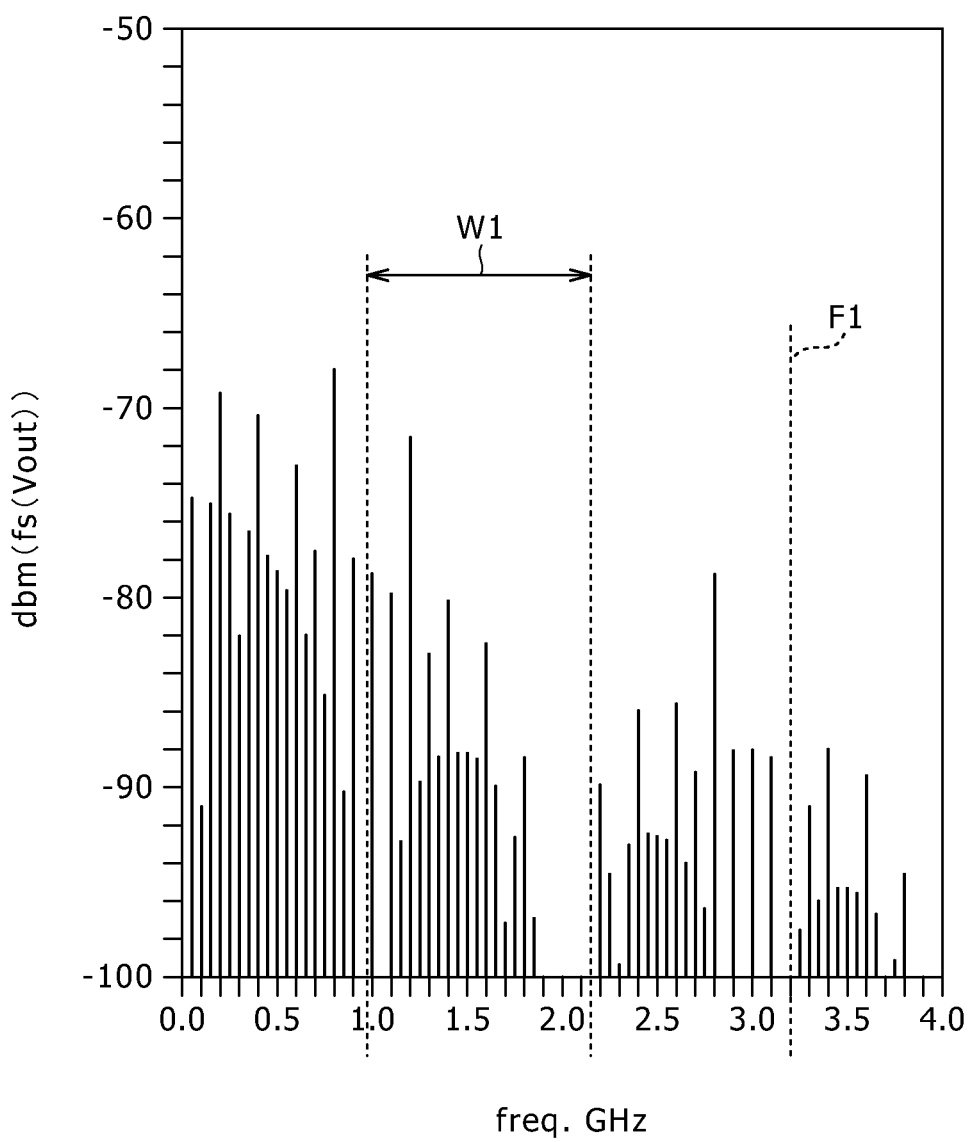
FIG. 6 is a diagram showing an example of the frequency spectrum of leakage noise observed at a satellite RF signal input terminal when the integrated circuit according to the first embodiment of the present technology is subjecting a terrestrial RF signal to signal processing.

FIG. 6 is a diagram showing an example of the frequency spectrum of leakage noise observed at the satellite RF signal input terminal 112 when the integrated circuit 100 according to the first embodiment of the present technology is subjecting the terrestrial RF signal to signal processing.

Incidentally, FIG. 6 shows the frequency spectrum of noise observed at a time of receiving a channel broadcast at 46 MHz which channel is included in the terrestrial RF signal.

In the frequency spectrum shown in FIG. 6, an interval representing the frequency band of the satellite RF signal (satellite broadcasting frequency band W1) and the position of the oscillation frequency of the common VCO 152 (VCO oscillation frequency F1) are indicated. As shown in the frequency spectrum of FIG. 6, much noise is observed in the satellite broadcasting frequency band W1. When the noise in the satellite broadcasting frequency band W1 is mixed in an antenna wire of satellite broadcasting, the noise is transmitted to another device reproducing satellite broadcasting. There is thus a possibility of occurrence of a problem in the reproduction of satellite broadcasting in another device.

The stop time leakage preventing section (satellite) 202 prevents the noise shown in the frequency spectrum of FIG. 6 from being transmitted from the satellite RF signal input terminal 112 to the outside. It is thereby possible to prevent the noise from being mixed in the antenna wire of satellite broadcasting.

Incidentally, the noise shown in FIG. 6 is also transmitted in the direction of the terrestrial RF signal input terminal 111. However, the noise flows in the opposite direction from the terrestrial RF signal, and is thus attenuated in the amplifier (the LNA 121 and the VGA 122) arranged in the middle of a path of the noise. In addition, the noise also flows in an IC having only a function of receiving terrestrial broadcasting. Accordingly, a measure similar to a measure against noise which measure has been taken in the past suffices. There is consequently a very small amount of noise leaking from the terrestrial RF signal input terminal 111 to the outside. There is thus little possibility of occurrence of the problem.

Effects of providing the stop time leakage preventing sections in the integrated circuit 100 will next be described with reference to FIG. 7.

[Example of Effects of Stop Time Leakage Preventing Sections]

Figure 7:
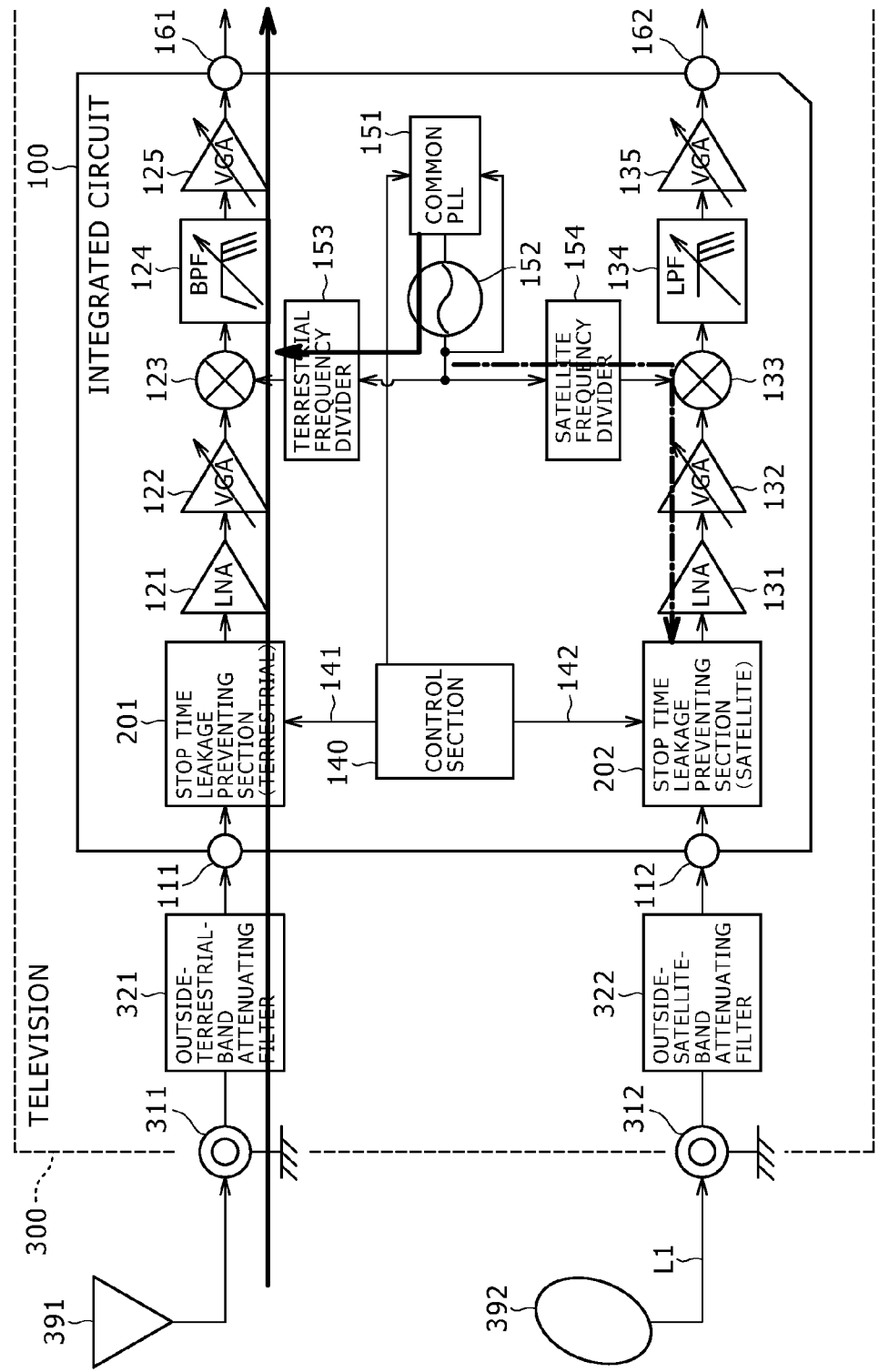
FIG. 7 is a diagram schematically showing effect of the stop time leakage preventing section when the terrestrial RF signal is subjected to signal processing in the first embodiment of the present technology.

FIG. 7 is a diagram schematically showing effects of the stop time leakage preventing sections when the terrestrial RF signal is subjected to signal processing in the first embodiment of the present technology.

FIG. 7 assumes a case in which the integrated circuit 100 is provided in a television 300, and a terrestrial channel is being reproduced.

FIG. 7 shows a terrestrial wave antenna 391 for receiving terrestrial waves, a satellite wave antenna 392 for receiving satellite waves, and the television 300.

Incidentally, a configuration up to the input of the terrestrial RF signal and the satellite RF signal to the integrated circuit 100 is schematically shown in the television 300. Shown as this configuration are an antenna input terminal (terrestrial wave) 311, an antenna input terminal (satellite wave) 312, an outside-terrestrial-band attenuating filter 321, an outside-satellite-band attenuating filter 322, and the integrated circuit 100.

The antenna input terminal (terrestrial wave) 311 is a terminal for connecting an antenna wire from the terrestrial wave antenna 391. The antenna input terminal (terrestrial wave) 311 supplies a signal from the terrestrial wave antenna 391 to the outside-terrestrial-band attenuating filter 321.

The outside-terrestrial-band attenuating filter 321 is a filter for removing a signal outside the terrestrial band from the signal from the terrestrial wave antenna 391. The outside-terrestrial-band attenuating filter 321 supplies the signal in the terrestrial band (terrestrial RF signal) to the terrestrial RF signal input terminal 111 of the integrated circuit 100.

The antenna input terminal (satellite wave) 312 is a terminal for connecting an antenna wire from the satellite wave antenna 392. The antenna input terminal (satellite wave) 312 supplies a signal from the satellite wave antenna 392 to the outside-satellite-band attenuating filter 322.

When a terrestrial channel is reproduced, the circuit that subjects the terrestrial RF signal to signal processing in the integrated circuit 100 is in an operating state, whereas the circuit that subjects the satellite RF signal to signal processing in the integrated circuit 100 is in a stopped state.

Here, suppose that the circuit that subjects the terrestrial RF signal to signal processing and the circuit that subjects the satellite RF signal to signal processing are separate ICs. In this case, the ICs are separated from each other, and one of the ICs is in a stopped state, so that there is a small possibility of noise caused in the IC in operation affecting the IC being stopped.

However, in a case where one IC has two receiving functions as in the integrated circuit 100, a same silicon die or a same package has the two receiving functions, so that there is an increased possibility of noise caused by one of the receiving functions affecting the other. For example, as shown in FIG. 7, when terrestrial broadcasting is received, harmonics and the leakage noise of the VCO circuit leak into the circuit on the satellite broadcasting side in the stopped state. This leaking noise leaks from the satellite RF signal input terminal 112 to the outside of the integrated circuit 100, passes through the outside-satellite-band attenuating filter 322, and then enters the antenna wire (wire L1) of satellite broadcasting. Incidentally, noise in the satellite band passes straight through the outside-satellite-band attenuating filter 322, and thus the noise flowing into the antenna wire (wire L1) can be an interfering signal interfering with another receiving device connected to the antenna wire (wire L1) of satellite broadcasting.

The stop time leakage preventing section (satellite) 202 in the integrated circuit 100 can prevent the television 300 from sending the interfering signal to another receiving device by preventing the noise from leaking from the satellite RF signal input terminal 112 to the antenna wire (wire L1).

[Example of Operation of Integrated Circuit]

The operation of the integrated circuit 100 in the first embodiment of the present technology will next be described with reference to drawings.

Figure 8:
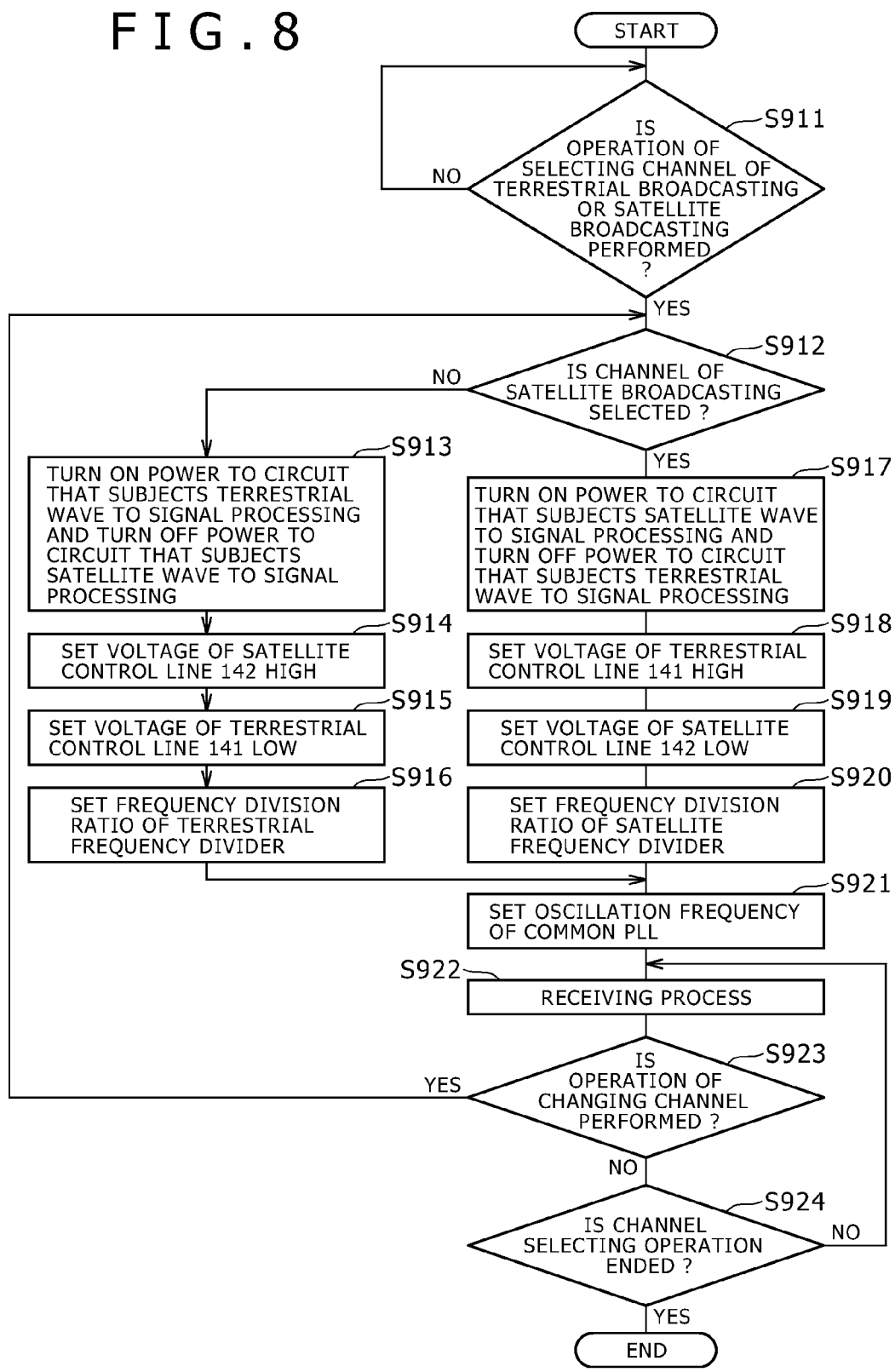
FIG. 8 is a flowchart of an example of a process procedure when a receiving process is performed by the integrated circuit in the first embodiment of the present technology.

FIG. 8 is a flowchart of an example of a process procedure when a receiving process is performed by the integrated circuit 100 in the first embodiment of the present technology.

First, whether a channel selecting operation for selecting a channel of terrestrial broadcasting or satellite broadcasting is performed is determined (step S911). When it is determined that no channel selecting operation is performed, waiting is performed until a channel selecting operation is performed.

When it is determined that a channel selecting operation is performed (step S911), on the other hand, whether a channel of satellite broadcasting is selected is determined (step S912). For example, when a user gives an instruction to view a channel of terrestrial broadcasting or satellite broadcasting on the device provided with the integrated circuit 100, information on the instruction is supplied to the control section 140, and the control section 140 determines that the channel selecting operation is performed.

When it is determined that no channel of satellite broadcasting is selected (a channel of terrestrial broadcasting is selected) (step S912), power to the circuit that subjects terrestrial waves (terrestrial RF signal) to signal processing is turned on, and power to the circuit that subjects satellite waves (satellite RF signal) to signal processing is turned off (step S913). Next, the voltage of the satellite control line 142 is set high (step S914), and the voltage of the terrestrial control line 141 is set low (step S915). Then, the frequency division ratio of the terrestrial frequency divider 153 is set according to the selected channel (step S916). The process thereafter proceeds to step S921.

When it is determined in step S912 that a channel of satellite broadcasting is selected, power to the circuit that subjects satellite waves to signal processing is turned on, and power to the circuit that subjects terrestrial waves to signal processing is turned off (step S917). Next, the voltage of the terrestrial control line 141 is set high (step S918), and the voltage of the satellite control line 142 is set low (step S919). Thereafter, the frequency division ratio of the satellite frequency divider 154 is set according to the selected channel (step S920).

Next, the oscillation frequency of the common PLL 151 is set according to the selected channel (step S921). Then, a receiving process is performed which generates the signal of only the selected channel from the signal from the antenna (the terrestrial RF signal or the satellite RF signal) (step S922).

Whether the channel for which the receiving process is being performed (selected channel) is changed is thereafter determined by the control section 140 (step S923). Then, when it is determined that the channel is changed and that one of channels of terrestrial broadcasting or satellite broadcasting is selected (step S923), the process returns to step S912.

When it is determined that the channel is not changed (step S923), on the other hand, whether the channel selecting operation is ended is determined (step S924). Then, when it is determined that the channel selecting operation is not ended (step S924), the process returns to step S922 to continue the receiving process for receiving the selected channel.

Incidentally, when it is determined in step S924 that the receiving operation is ended (for example when power to the device provided with the integrated circuit 100 is turned off), the operation of the receiving process is ended.

Thus, according to the first embodiment of the present technology, the circuit for receiving terrestrial broadcasting and the circuit for receiving satellite broadcasting are provided with respective dedicated circuits (amplifying circuits, mixers, filters, and the like). It is therefore possible to design an integrated circuit in which the two receiving functions each have appropriate performance. In addition, the IC area can be made smaller by sharing the circuit for generating the local oscillating signal. That is, according to the first embodiment of the present technology, the receiving device having the functions of receiving the two broadcasts can be made to deliver appropriate performance.

In addition, according to the first embodiment of the present technology, a function of preventing noise from leaking from the stopped side, which function is necessary in the receiving device having the functions of receiving the two broadcasts, is achieved by the stop time leakage preventing sections. Therefore the receiving device can be made to deliver necessary performance (appropriate performance).

It is to be noted that while description has been made of an example in which a stop time leakage preventing section is provided for both of terrestrial waves and satellite waves in the first embodiment of the present technology, the present technology is not limited to this. It may be assumed for example that depending on the performance of the circuits arranged in the integrated circuit, for example, an amount of noise leaking from one input terminal is so small as not to affect other devices. In such a case, a stop time leakage preventing section may be disposed on only a side where a large amount of noise leaks, for example.

<2. Second Embodiment>

In the first embodiment of the present technology, description has been made of an example in which a stop time leakage preventing section has a switch for preventing noise from leaking from the input terminal to the outside of the integrated circuit. When the switch is provided on the path of the noise, the noise can be prevented from leaking to the outside of the integrated circuit by turning on and off the switch. However, because the position where the stop time leakage preventing section is provided is also a position on the path of the terrestrial RF signal or the satellite RF signal, the terrestrial RF signal or the satellite RF signal may be degraded by a parasitic on resistance occurring in the switch.

Accordingly, in a second embodiment of the present technology, an example in which noise is prevented from leaking by a method different from the method using the switch will be described with reference to FIG. 9 and FIG. 10.

[Example of Circuit Configuration of Stop Time Leakage Preventing Section (Satellite)]

FIG. 9 is a schematic diagram showing an example of circuit configuration of a stop time leakage preventing section (satellite) 402 in the second embodiment of the present technology.

Incidentally, the stop time leakage preventing section (satellite) 402 shown in FIG. 9 is provided to an integrated circuit 100 in place of the stop time leakage preventing section (satellite) 202 shown in FIG. 3.

The stop time leakage preventing section (satellite) 402 includes a grounding transistor 430, a resistance 440, a coil 450, and a variable capacitance section 460 formed by a plurality of capacitances each provided with a transistor. Incidentally, the grounding transistor 430 and the resistance 440 correspond to the grounding transistor 240 and the resistance 230, respectively, shown in FIG. 3, and therefore detailed description thereof will be omitted here.

In addition, the stop time leakage preventing section (satellite) 402 is connected with a grounding control line 431 and a signal line 461 from a control section 140 in place of the satellite control line 142 shown in FIG. 3. The grounding control line 431 is connected to the gate terminal of the grounding transistor 430 to control the on/off state of the grounding transistor 430. The signal line 461 is formed by a plurality of signal lines. The plurality of signal lines are connected to the plurality of transistors, respectively, of the variable capacitance section 460.

The coil 450 and the variable capacitance section 460 will be described in the following.

The coil 450 and the variable capacitance section 460 form an LC resonance circuit. One end of the coil 450 is connected to a signal line from a satellite RF signal input terminal 112 to an LNA 131. Another end of the coil 450 is connected to the plurality of capacitances of the variable capacitance section 460. When the transistors connected respectively to the plurality of capacitances of the variable capacitance section 460 are each turned on or off, the on/off states of the grounding of the plurality of capacitances are controlled. The magnitude of the capacitance forming the LC resonance circuit is thereby adjusted. Thus, resonance frequency can be controlled.

Description in the following will be made of the operation of the stop time leakage preventing section (satellite) 402 during satellite broadcasting receiving operation (during the signal processing of a satellite RF signal) and during terrestrial broadcasting receiving operation (during the signal processing of a terrestrial RF signal).

During the satellite broadcasting receiving operation, the voltage of the grounding control line 431 is set low, and the voltages of all of the signal lines included in the signal line 461 are set low. That is, a resistance of 75Ω (resistance 440) is not connected, so that impedance does not change, and none of the capacitances in the LC resonance circuit is connected, so that the LC resonance circuit does not resonate. Therefore, during the satellite broadcasting receiving operation, the circuit of the stop time leakage preventing section (satellite) 402 hardly affects the satellite broadcasting receiving operation.

During the terrestrial broadcasting receiving operation, on the other hand, the voltage of the grounding control line 431 is set high. The impedance of the satellite RF signal input terminal 112 is thereby maintained at 75 Ω.

In addition, during the terrestrial broadcasting receiving operation, the control section 140 detects the frequency of noise constituting a large amount of leakage in particular from settings relating to the oscillation of the common PLL 151 and the common VCO 152, and makes the LC resonance circuit resonate at the frequency. For example, the control section 140 retains a list of relations between oscillation frequency and noise, and detects the frequency using the list.

Then, the control section 140 sets each of the voltages of the plurality of signal lines included in the signal line 461, and adjusts the magnitude of the capacitance of the LC resonance circuit, so that the LC resonance circuit resonates at the detected noise frequency. For example, when noise at the oscillation frequency of the common VCO 152 constitutes a largest amount of noise, capacitances to be connected are determined from the plurality of capacitances of the variable capacitance section 460 so that the LC resonance circuit resonates at the oscillation frequency, and the voltages of the gate terminals of switches (transistors) controlling the connection of the determined capacitances are set high. The LC resonance circuit thereby resonates at the oscillation frequency of the common VCO 152, thus preventing noise caused by the common VCO 152 effectively.

Incidentally, as shown in FIG. 9, the stop time leakage preventing section (satellite) 402 does not need a switch disposed in series on the path of transmission of the satellite RF signal. The stop time leakage preventing section (satellite) 402 can therefore greatly reduce signal degradation in the satellite RF signal due to the parasitic on resistance of the switch.

The resonance of the stop time leakage preventing section (satellite) 402 will next be described with reference to FIG. 10.

[Example of Resonance of Stop Time Leakage Preventing Section (Satellite)]

Figure 10:
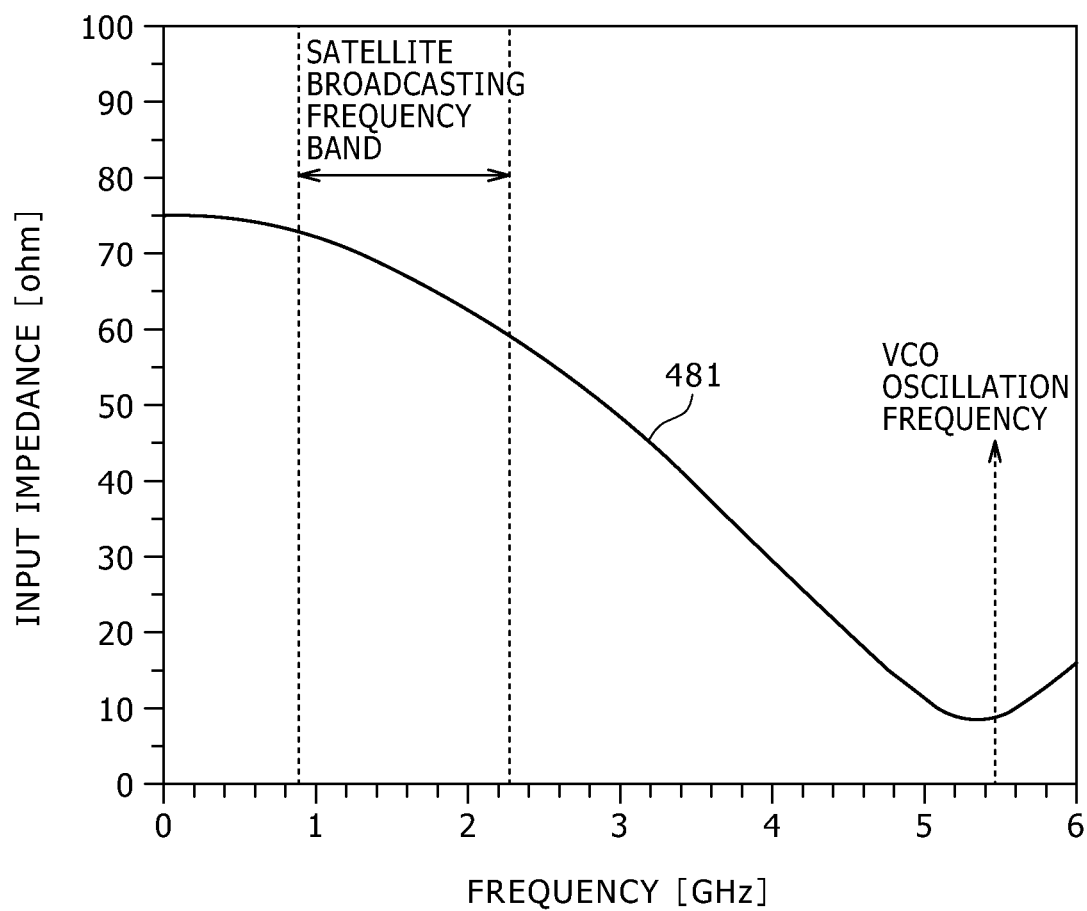
FIG. 10 is a graph showing an example of resonance of the stop time leakage preventing section (satellite) in the second embodiment of the present technology.

FIG. 10 is a graph showing an example of resonance of the stop time leakage preventing section (satellite) 402 in the second embodiment of the present technology.

The graph of FIG. 10 shows a curve (curve 481) representing the input impedance at different frequencies when the stop time leakage preventing section (satellite) 402 is resonating, with an axis of abscissas indicating frequency, and with an axis of ordinates indicating the input impedance.

Incidentally, description will be made assuming that in the graph, the oscillation frequency of the common VCO 152 is about 5.4 GHz, and that the stop time leakage preventing section (satellite) 402 is resonating at a frequency around the 5.4 GHz.

As indicated by the curve 481, the impedance is minimized at about the 5.4 GHz, which is the resonance frequency of the LC resonance circuit of the stop time leakage preventing section (satellite) 402. Therefore, the noise at about the frequency of 5.4 GHz is reduced by the LC resonance circuit, so that an amount of noise leaking from the satellite RF signal input terminal 112 can be reduced.

Incidentally, a flowchart of the second embodiment of the present technology is different from the flowchart of the first embodiment only in that the procedure for controlling the voltages of the satellite control line 142 and the terrestrial control line 141 in FIG. 8 is changed to a procedure for controlling the voltages of the grounding control line 431 and the signal line 461. Therefore description of the flowchart of the second embodiment of the present technology will be omitted.

Thus, according to the second embodiment of the present technology, a leakage of noise from the input terminal on the side where operation is stopped can be prevented by using the LC resonance circuit.

<3. Third Embodiment>

In the first embodiment of the present technology, an example of preventing noise from being discharged by using a switch has been described, and in the second embodiment of the present technology, an example of preventing a discharge of noise by the LC resonance circuit has been described. Thus, a plurality of methods are conceivable as methods for preventing noise from being discharged from the input terminal of a circuit on a stopped side.

An example in which a stop time leakage preventing section is formed by a circuit that generates a signal of opposite phase to noise to cancel out noise will next be described with reference to FIG. 11.

[Example of Circuit Configuration of Stop Time Leakage Preventing Section (Satellite)]

Figure 11:
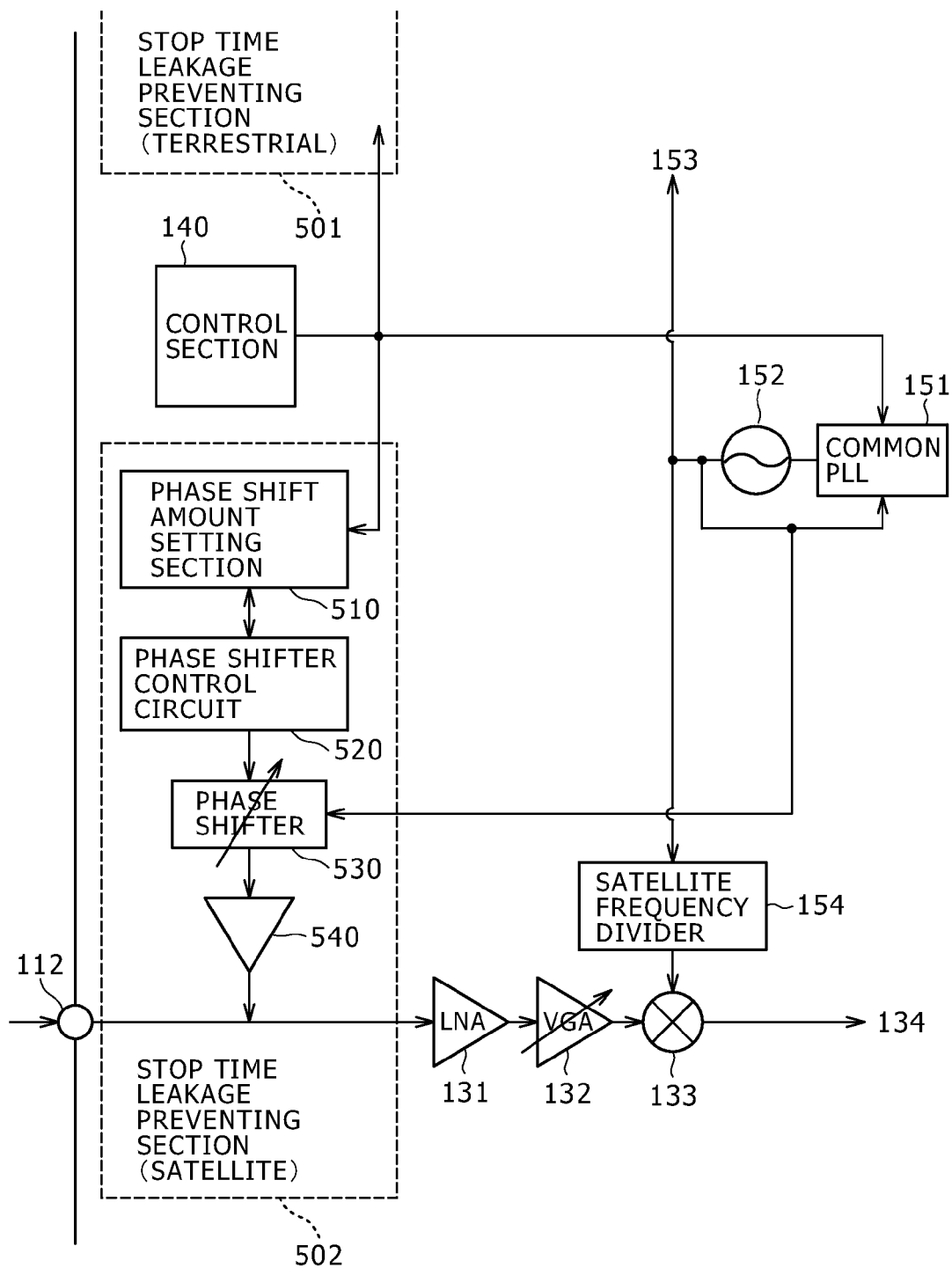
FIG. 11 is a schematic diagram showing an example of circuit configuration of a stop time leakage preventing section (satellite) in a third embodiment of the present technology.

FIG. 11 is a schematic diagram showing an example of circuit configuration of a stop time leakage preventing section (satellite) 502 in a third embodiment of the present technology.

Incidentally, the stop time leakage preventing section (satellite) 502 shown in FIG. 11 is provided to an integrated circuit 100 in place of the stop time leakage preventing section (satellite) 202 shown in FIG. 3. Incidentally, constituent elements other than those of the stop time leakage preventing section (satellite) 502 shown in FIG. 11 are similar to that shown in FIG. 3. Thus, the constituent elements other than those of the stop time leakage preventing section (satellite) 502 shown in FIG. 11 are identified by the same reference numerals, and description thereof will be omitted in the following.

The stop time leakage preventing section (satellite) 502 includes a phase shift amount setting section 510, a phase shifter control circuit 520, a phase shifter 530, and an opposite phase adding amplifier 540. Incidentally, the phase shift amount setting section 510 in the stop time leakage preventing section (satellite) 502 is supplied with a signal for controlling the oscillation frequency of a common PLL 151 (oscillation frequency control signal) from a control section 140. In addition, the phase shifter 530 in the stop time leakage preventing section (satellite) 502 is supplied with a signal output by a common VCO 152 (local oscillating signal).

The phase shift amount setting section 510 retains information for determining an amount of phase shift in the phase shifter 530 (which information is a table of correlation between frequency and an amount of phase shift), and sets an amount of phase shift on the basis of the oscillation frequency control signal supplied from the control section 140. This table of correlation between the frequency and the amount of phase shift is a table in which the oscillation frequency of the common PLL 151 and the amount of phase shift are associated with each other in advance. Because the oscillation frequency of the common VCO 152 is interlocked with the oscillation frequency of the common PLL 151, the amount of phase shift necessary to cancel out the noise of the common VCO 152 can be obtained from the oscillation frequency control signal. Accordingly, when the table of correlation between the frequency and the amount of phase shift is retained in advance, the noise caused by the common VCO 152 can be cancelled out irrespective of the frequency of a channel according to which the oscillation frequency of the common VCO 152 is set.

The phase shift amount setting section 510 retrieves the amount of phase shift associated with the oscillation frequency control signal supplied from the control section 140 from the table of correlation between the frequency and the amount of phase shift, and supplies the retrieved amount of phase shift to the phase shifter control circuit 520.

The phase shifter control circuit 520 controls the phase shifter 530. The phase shifter control circuit 520 controls the phase shifter 530 so as to achieve a phase shift by the amount of phase shift supplied from the phase shift amount setting section 510.

The phase shifter 530 generates a signal of opposite phase by shifting the phase of the signal generated by the common VCO 152 (local oscillating signal) under control of the phase shifter control circuit 520. The phase shifter 530 supplies the generated signal (signal of opposite phase) to the opposite phase adding amplifier 540.

The opposite phase adding amplifier 540 adds the signal of opposite phase supplied from the phase shifter 530 to a signal input from a satellite RF signal input terminal 112 (satellite RF signal). Incidentally, when noise reduction is not performed (when satellite broadcasting is received), the opposite phase adding amplifier 540 is set to an impedance higher than the impedance of an LNA 131. When the opposite phase adding amplifier 540 is set to the higher impedance, the opposite phase adding amplifier 540 hardly affects the satellite RF signal during satellite broadcasting receiving operation.

By thus cancelling out noise by the opposite phase, the noise included in the signal generated by the common VCO 152 (local oscillating signal) is cancelled out by the opposite phase. Thereby, noise discharged from the satellite RF signal input terminal 112 can be reduced. That is, in the third embodiment of the present technology, a leakage of noise from the input terminal on the side where operation is stopped can be prevented by generating a signal of opposite phase to the noise caused by the common VCO 152 and cancelling out the noise by the signal of opposite phase.

Thus, according to the embodiments of the present technology, one receiving device can be provided with the functions of receiving the two broadcasts which functions have appropriate performance by providing the circuit for receiving terrestrial broadcasting and the circuit for receiving satellite broadcasting with respective dedicated circuits and sharing the circuit for generating the local oscillating signal.

Thereby, fears of an increase in design cost for achieving commonality, an increase in power consumption as a result of providing a high-performance circuit necessary to achieve commonality, and the like are reduced, and optimum design for each of the receptions is made possible. In addition, the IC area can be made smaller by sharing the circuit for generating the local oscillating signal.

Further, according to the embodiments of the present technology, by providing the stop time leakage preventing sections, it is possible to prevent a leakage of noise from the input terminal on the side where operation is stopped, which is a problem specific to an integrated circuit having both of a function of receiving terrestrial broadcasting and a function of receiving satellite broadcasting.

It is to be noted that while in the embodiments of the present technology, description has been made of an example in which the terrestrial RF signal is received by the Low-IF system and the satellite RF signal is received by the Zero-IF system, the present technology is not limited to this. For example, there may be a case where the terrestrial RF signal is received by the Zero-IF system and the satellite RF signal is received by the Low-IF system. In addition, there may be for example a case where both of the terrestrial RF signal and the satellite RF signal are received by the Low-IF system, or a case where both of the terrestrial RF signal and the satellite RF signal are received by the Zero-IF system. In addition, there may be for example a case where the terrestrial RF signal and the satellite RF signal are received by another system (for example a superheterodyne system).

It is to be noted that while in the embodiments of the present technology, description has been made of an example in which the stop time leakage preventing section is disposed between the input terminal and the LNA so that noise occurring anywhere within the integrated circuit can be prevented from leaking, the present technology is not limited to this. For example, when only the common PLL and the common VCO are a source of leaking noise, the stop time leakage preventing section may be disposed at some position in a path from the common VCO to the input terminal (for example between the LNA and the VGA).

It is to be noted that in the embodiments of the present technology, description has been made of an example in which two frequency dividers, that is, a terrestrial frequency divider and a satellite frequency divider are provided. Thereby, the local oscillating signals necessary in the respective mixers can be generated relatively easily. Incidentally, the present technology is not limited to the case of providing two frequency dividers. One universal frequency divider (frequency divider whose frequency division ratio can be set in a wide range) may be provided, and the output of the frequency divider may be supplied to the mixer for terrestrial broadcasting and the mixer for satellite broadcasting.

It is to be noted that the foregoing embodiments represent an example for embodying the present technology, and that items in the embodiments have respective corresponding relations to specific inventive items in claims. Similarly, specific inventive items in claims have respective corresponding relations to items given the same names as the specific inventive items in the embodiments of the present technology. However, the present technology is not limited to the embodiments, and can be embodied by making various modifications to the embodiments without departing from the spirit of the present technology.

In addition, the process procedures described in the foregoing embodiments may be construed as a method having the series of procedures, and may be construed as a program for making a computer perform the series of procedures or a recording medium storing the program. Usable as the recording medium is for example a hard disk, a CD (Compact Disc), an MD (MiniDisc), a DVD (Digital Versatile Disc), a memory card, or a Blu-ray Disc (registered trademark).

Incidentally, the present technology can also adopt the following constitutions.

(1) A receiving device including:
an oscillating section configured to generate a local oscillating signal for performing frequency conversion of one reception target channel of channels in broadcasting using a first frequency band and channels in broadcasting using a second frequency band different from the first frequency band;
a first receiving section configured to perform generation of a channel signal for obtaining broadcasting output of the reception target channel on a basis of the generated local oscillating signal and a high-frequency signal in the first frequency band when the reception target channel is a channel in the first frequency band, and not to perform the generation when the reception target channel is a channel in the second frequency band; and
a second receiving section configured to perform generation of the channel signal on a basis of the generated local oscillating signal and a high-frequency signal in the second frequency band when the reception target channel is a channel in the second frequency band, and not to perform the generation when the reception target channel is a channel in the first frequency band.

(2) The receiving device according to the above (1), further including
a noise leakage preventing section configured to prevent noise occurring in the receiving device from leaking into an antenna wire transmitting the high-frequency signal in the first frequency band.

(3) The receiving device according to the above (2), wherein the noise leakage preventing section is formed by a transistor disposed on a path through which the high-frequency signal in the first frequency band and the noise pass, the transistor is set in a conducting state when the reception target channel is a channel in the first frequency band, and the transistor is set in a nonconducting state when the reception target channel is a channel in the second frequency band.

(4) The receiving device according to the above (2), wherein the noise leakage preventing section is formed by a resonance circuit connected in parallel with a path through which the high-frequency signal in the first frequency band and the noise pass, the resonance circuit resonates according to a capacitance of a magnitude corresponding to a frequency of the local oscillating signal when the reception target channel is a channel in the second frequency band, and the resonance circuit does not resonate when the reception target channel is a channel in the first frequency band.

(5) The receiving device according to the above (2), wherein when the reception target channel is a channel in the second frequency band, the noise leakage preventing section supplies a signal of opposite phase to noise occurring in the oscillating section to a path through which the high-frequency signal in the first frequency band and the noise pass.

(6) The receiving device according to the above (2), wherein the noise leakage preventing section includes an impedance maintaining circuit for maintaining impedance at an input terminal for inputting the high-frequency signal in the first frequency band to the receiving device at a predetermined value.

(7) The receiving device according to the above (1), further including
at least one of a noise leakage preventing section configured to prevent noise occurring in the receiving device from leaking into an antenna wire transmitting the high-frequency signal in the first frequency band and a noise leakage preventing section configured to prevent the noise occurring in the receiving device from leaking into an antenna wire transmitting the high-frequency signal in the second frequency band.

(8) The receiving device according to any one of the above (1) to (7), wherein one of a frequency band of terrestrial broadcasting and a frequency band of satellite broadcasting is the first frequency band, and the other is the second frequency band.

(9) The receiving device according to any one of the above (1) to (8), wherein the oscillating section, the first receiving section, and the second receiving section are incorporated in one semiconductor integrated circuit.

(10) A semiconductor integrated circuit including:
an oscillating section configured to generate a local oscillating signal for performing frequency conversion of one reception target channel of channels in broadcasting using a first frequency band and channels in broadcasting using a second frequency band different from the first frequency band;
a first receiving section configured to perform generation of a channel signal for obtaining broadcasting output of the reception target channel on a basis of the generated local oscillating signal and a high-frequency signal in the first frequency band when the reception target channel is a channel in the first frequency band, and not to perform the generation but to prevent noise occurring in the receiving device from leaking into an antenna wire transmitting the high-frequency signal in the first frequency band when the reception target channel is a channel in the second frequency band; and
a second receiving section configured to perform generation of the channel signal on a basis of the generated local oscillating signal and a high-frequency signal in the second frequency band when the reception target channel is a channel in the second frequency band, and not to perform the generation when the reception target channel is a channel in the first frequency band.

The present disclosure contains subject matter related to that disclosed in Japanese Priority Patent Application JP 2012-106394 filed in the Japan Patent Office on May 8, 2012, the entire content of which is hereby incorporated by reference.

What is claimed is:

1. A receiving device comprising:
an oscillating section configured to generate a local oscillating signal for performing frequency conversion of one reception target channel of channels in broadcasting using a first frequency band and channels in broadcasting using a second frequency band different from the first frequency band;
a first receiving section configured to perform generation of a channel signal for obtaining broadcasting output of the reception target channel on a basis of the generated local oscillating signal and a high-frequency signal in the first frequency band when the reception target channel is a channel in the first frequency band, and not to perform the generation when the reception target channel is a channel in the second frequency band; and
a second receiving section configured to perform generation of the channel signal on a basis of the generated local oscillating signal and a high-frequency signal in the second frequency band when the reception target channel is a channel in the second frequency band, and not to perform the generation when the reception target channel is a channel in the first frequency band.

2. The receiving device according to claim 1, further comprising
a noise leakage preventing section configured to prevent noise occurring in the receiving device from leaking into an antenna wire transmitting the high-frequency signal in the first frequency band.

3. The receiving device according to claim 2, wherein the noise leakage preventing section is formed by a transistor disposed on a path through which the high-frequency signal in the first frequency band and the noise pass, the transistor is set in a conducting state when the reception target channel is a channel in the first frequency band, and the transistor is set in a nonconducting state when the reception target channel is a channel in the second frequency band.

4. The receiving device according to claim 2, wherein the noise leakage preventing section is formed by a resonance circuit connected in parallel with a path through which the high-frequency signal in the first frequency band and the noise pass, the resonance circuit resonates according to a capacitance of a magnitude corresponding to a frequency of the local oscillating signal when the reception target channel is a channel in the second frequency band, and the resonance circuit does not resonate when the reception target channel is a channel in the first frequency band.

5. The receiving device according to claim 2, wherein when the reception target channel is a channel in the second frequency band, the noise leakage preventing section supplies a signal of opposite phase to noise occurring in the oscillating section to a path through which the high-frequency signal in the first frequency band and the noise pass.

6. The receiving device according to claim 2, wherein the noise leakage preventing section includes an impedance maintaining circuit for maintaining impedance at an input terminal for inputting the high-frequency signal in the first frequency band to the receiving device at a predetermined value.

7. The receiving device according to claim 1, further comprising
at least one of a noise leakage preventing section configured to prevent noise occurring in the receiving device from leaking into an antenna wire transmitting the high-frequency signal in the first frequency band and a noise leakage preventing section configured to prevent the noise occurring in the receiving device from leaking into an antenna wire transmitting the high-frequency signal in the second frequency band.

8. The receiving device according to claim 1, wherein one of a frequency band of terrestrial broadcasting and a frequency band of satellite broadcasting is the first frequency band, and the other is the second frequency band.

9. The receiving device according to claim 1, wherein the oscillating section, the first receiving section, and the second receiving section are incorporated in one semiconductor integrated circuit.

10. A semiconductor integrated circuit comprising:
an oscillating section configured to generate a local oscillating signal for performing frequency conversion of one reception target channel of channels in broadcasting using a first frequency band and channels in broadcasting using a second frequency band different from the first frequency band;
a first receiving section configured to perform generation of a channel signal for obtaining broadcasting output of the reception target channel on a basis of the generated local oscillating signal and a high-frequency signal in the first frequency band when the reception target channel is a channel in the first frequency band, and not to perform the generation but to prevent noise occurring in the receiving device from leaking into an antenna wire transmitting the high-frequency signal in the first frequency band when the reception target channel is a channel in the second frequency band; and a second receiving section configured to perform generation of the channel signal on a basis of the generated local oscillating signal and a high-frequency signal in the second frequency band when the reception target channel is a channel in the second frequency band, and not to perform the generation when the reception target channel is a channel in the first frequency band.

* * * * *